United States Patent [19]

Budnick

[11] 4,118,097
[45] Oct. 3, 1978

[54] BATTERY CABLE TERMINAL ASSEMBLY AND METHOD OF MANUFACTURE

[75] Inventor: Lawrence T. Budnick, St. Charles, Ill.

[73] Assignee: Altek Systems, Inc., Aurora, Ill.

[21] Appl. No.: 755,500

[22] Filed: Dec. 29, 1976

[51] Int. Cl.² ............................................. H01R 11/06
[52] U.S. Cl. ................................ 339/232; 339/275 T
[58] Field of Search ................................ 339/224–240, 339/275 R, 275 T, 430 M

[56] References Cited

U.S. PATENT DOCUMENTS

| 2,399,836 | 5/1946 | Taylor | 339/275 T X |
| 2,903,672 | 9/1959 | Ade | 339/232 |
| 3,605,065 | 9/1971 | Shannon | 339/224 X |
| 3,928,079 | 12/1975 | Jennings et al. | 339/224 X |

*Primary Examiner*—Granville Y. Custer, Jr.
*Assistant Examiner*—E. F. Desmond
*Attorney, Agent, or Firm*—Charles F. Pigott, Jr.

[57] ABSTRACT

The following specification describes a cable terminal assembly incorporating a conductive metal plate secured to a variable size multi strand cable by casting or molding a mass of conductive casting material around the plate and cable to form a mechanical junction as well as an electrical connection therebetween. The plate and conductive casting material are covered by an insulating jacket. Aligned passages are provided in the jacket above and below the plate in alignment with an aperture in the plate to permit the plate to be electrically secured to battery terminals employing studs for fastening. The passage in the insulating jacket above the plate is defined by a ring having an outer diameter sized for nesting within the jacket passage below the plate of a second cable terminal assembly, so that two or more cable terminal assemblies may be stacked on a single battery terminal stud at a desired angular orientation. The ring formed on the insulated jacket, whether mounted on a battery terminal stud singly or in stacked multiples, provides a moisture seal at the terminal to impede or prevent corrosion, normally a serious problem with battery cable systems. Stacking two of the cable terminal assemblies on a battery terminal stud with a conductive spacer in the jacket ring of the lowermost cable terminal assembly provides an electrical connection between the plates of the two stacked cable terminal assemblies and permits a plurality of connections to be established at each battery terminal. The conductive spacer can be a separate ring shape, or can be permanently attached to the lowermost terminal plate, or the plate can be formed to provide a functional spacer. The foregoing cable terminal assembly simplifies the cabling and connections required for connecting a plurality of engine starting batteries in common, and impedes or prevents corrosion at the terminals.

13 Claims, 14 Drawing Figures

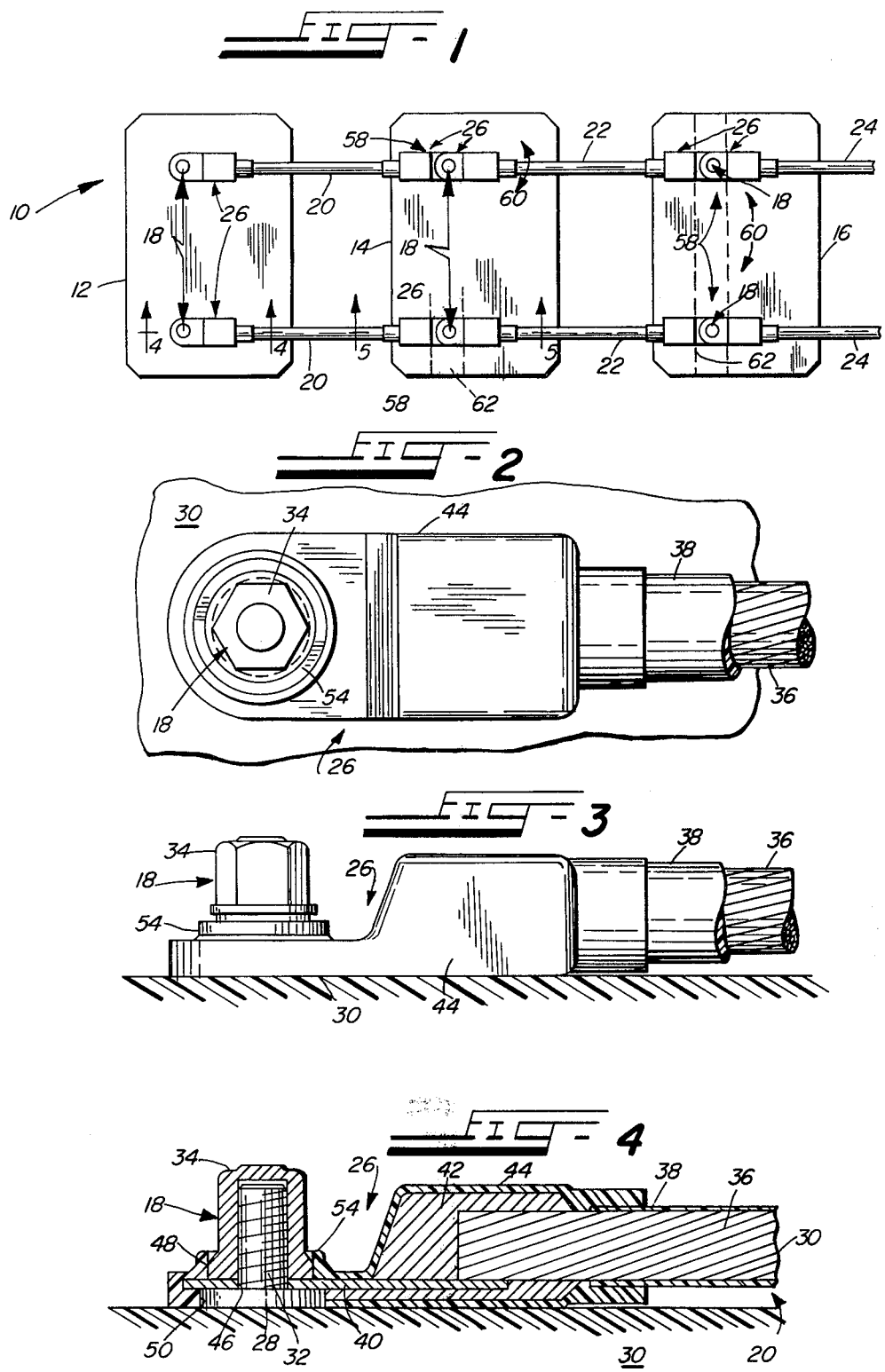

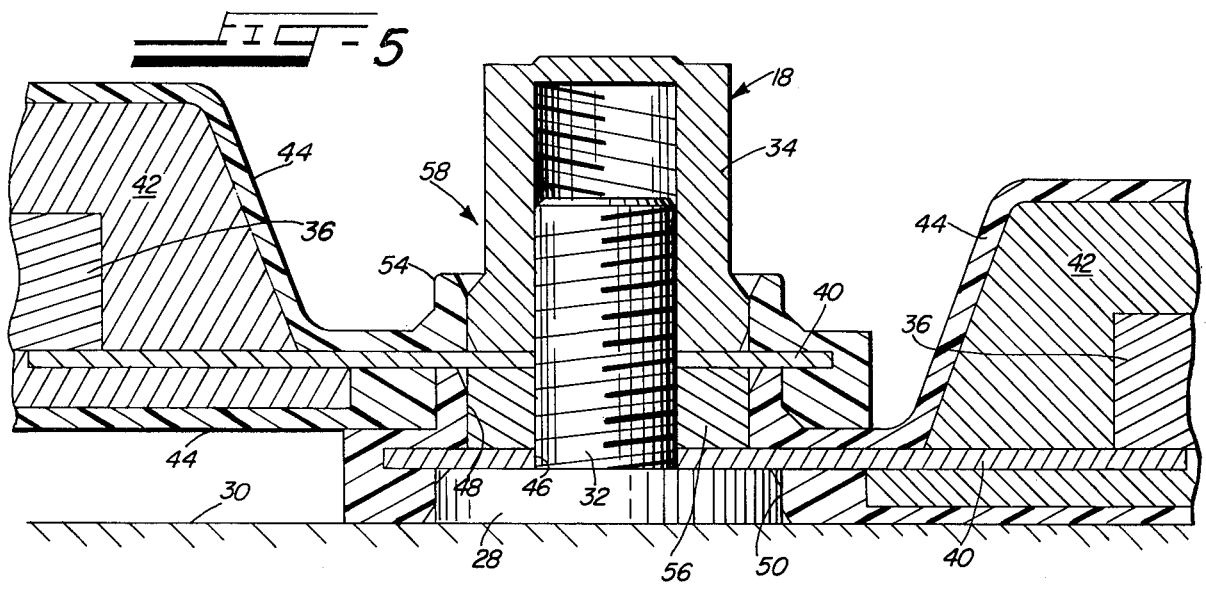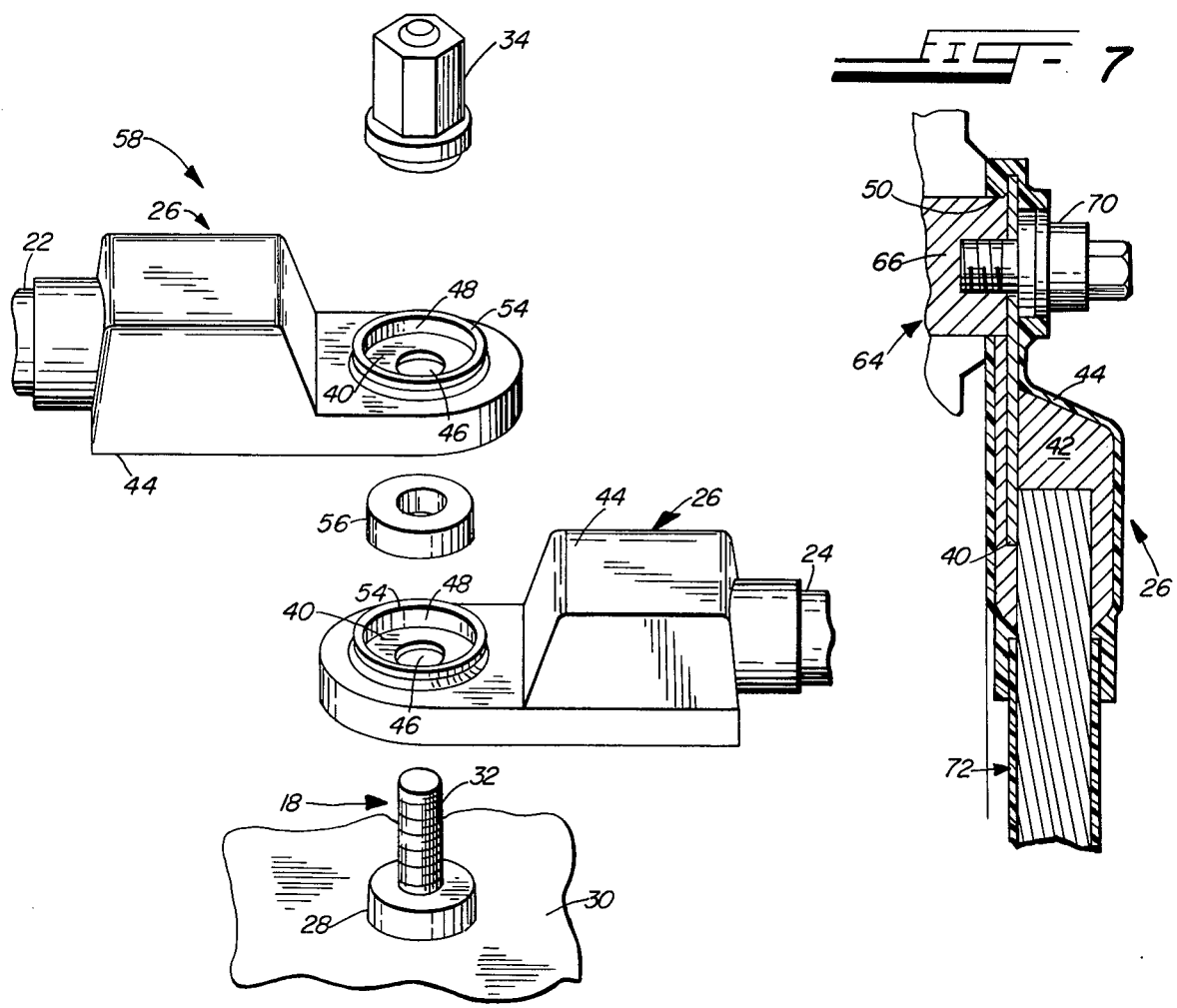

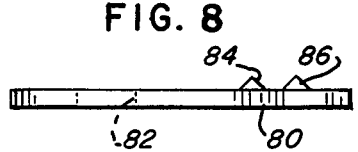
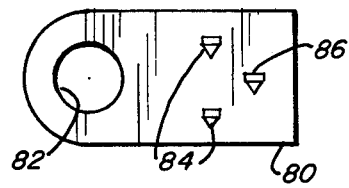
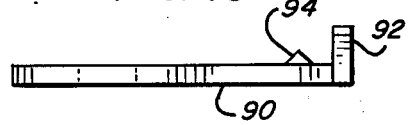
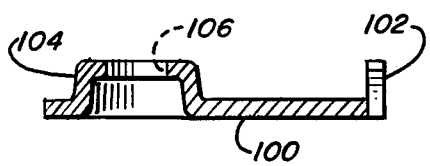
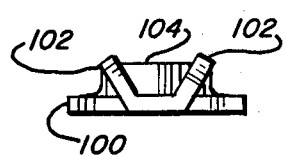
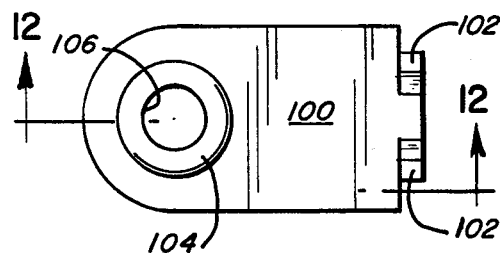

BATTERY CABLE TERMINAL ASSEMBLY AND METHOD OF MANUFACTURE

FIELD OF THE INVENTION

This invention relates in general to cable terminals and more particularly to an economical and more versatile battery cable terminal assembly and method for forming the same.

SUMMARY OF THE PRIOR ART

Commonly vehicle batteries utilize a tapered lead terminal which projects from the battery housing and receives a cable terminal formed of lead in a ring shape at one end. The ring shaped lead terminal is forced into tight engagement with the tapered battery terminal. The cable terminal is usually cast in the desired shape and connected at the other end to the wire strands of the cable during the casting. Moisture protection at the terminal connection, if any, is provided by a lubricating material or a pre-formed loose boot or cover.

In the new maintenance free battery designs, the battery terminal commonly comprises a steel stud projecting from the top of the battery and having a conductive shoulder or boss at the lower end adjacent the battery housing. The cable terminal assembly for use with this type of battery terminal is a flat relatively thin conductive plate with an aperture for receiving the stud and enabling the plate to engage against the boss. A nut is then threaded onto the stud to hold the plate and cable terminal assembly to the battery terminal. It is obvious that the use of a terminal plate formed of lead is not feasible under these circumstances, since the lead would permanently deform between the stud and nut, and would not provide for adequate moisture protection to resist corrosion which would defeat the purpose of a maintenance free battery.

The cable comprises a plurality of copper wire strands. In order to connect the conductive plate to the cable, the end of the plate spaced from the aperture is formed into an annular or ring shape and crimped onto the exposed end of the cable wires and another portion of the plate crimped onto the insulating cover of the cable.

An insulating jacket is molded over the plate and exposed cable portion after the fastening operation, and the jacket is provided with upper and lower annular openings aligned with the plate aperture for enabling the plate to be engaged with the stud boss and to be secured in electrical engagement therewith. The wall of the jacket passages are not presently designed to be received in the jacket passage of another cable terminal assembly. Therefore stacking of cable terminal assemblies is not feasible and only one connection can be made to a battery terminal.

For large or diesel engines such as are used in a variety of vehicles, trucks, agricultural machines or other types of heavy equipment, a system employing a plurality of batteries connected in common is used in engine starting or for other purposes. The inability to make more than one connection to a battery terminal presents a serious economic problem, since each battery terminal must otherwise be connected over a respective cable to a common position or terminal group. This is done by extending a cable from each battery terminal to the common terminal position, and from there a cable is extended for operating the engine starter. Alternatively, cables from the furthest battery terminals are extended to an intermediate common terminal position, additional cables are extended to a final common terminal position, and from there a cable is extended to the engine starter.

In either event, a considerable length of copper cable is required, since the cable lengths are duplicated, and one or more common terminal groups must be provided. This is of course quite expensive in both materials and labor required for the various connections. Additionally, the cable assemblies or harnesses are prefabricated by different manufacturers and are designed to fit only one of the cabling arrangements described above. They are therefore not easily interchangeable, when repair or replacement are required, nor is sufficient moisture protection provided at terminal points.

SUMMARY OF THE INVENTION

In the present invention the cable terminal assembly is formed by a conductive metal plate which is secured to the multi-conductor cable by casting or molding a mass of conductive casting material wholly or partially around the copper wire and one end of the plate to encapsulate a portion of both the plate and the wire in the conductive casting material. The conductive metal plate at its point of contact with the cable may be flat, or it may be shaped to increase the contact surface. The conductive metal plate has the necessary strength and rigidity to withstand the pressure applied between the battery terminal stud and associated nut, while the connection established from the plate bonded to the wire with conductive casting material provides a low resistance electrical path of great strength and rigidity capable of economically attaching different sized cables to the plate.

An insulating jacket is then molded over the conductive metal plate and mass of conductive casting material. The jacket is provided with upper and lower passages registering or aligned with an aperture in the plate. The lower passage in the jacket is not only adapted to receive the battery terminal boss, but it is also adapted to receive the ring or annular projecting wall portion defining the upper passage in the jacket, thereby providing a moisture seal. Thus, the terminal assembly of one cable may be engaged with a battery terminal stud, and a second cable terminal assembly stacked thereabove on the stud and a connection established between the plates of the two stacked cable terminal assemblies by a conductive spacer ring positioned in the upper passage of the lower cable terminal assembly.

With two or more connections established to one battery terminal by means of the stacked cable terminal assemblies, the battery terminals are connected in common by the simple expedient of extending the cable directly therebetween thereby eliminating the need for extra lengths of cable and connection to external terminal positions or groups.

The nested portions of the jackets defining the passages of the stacked cable terminal assemblies have a circular configuration so that they also serve as a pivot to permit any desired angular orientation of the cables relative to each other. Since the relative positions and orientation of multiple battery arrangements are largely standardized, the cables may be prefabricated to predetermined lengths for facile installation in different types of commonly connected systems.

It will be noted that the wall of the lower passage in the insulating jacket is arranged to not only receive the stud boss of batteries of the type described above, but is also adapted to receive a nut carried at the side portion of a new maintenance free automotive battery, and since the conductive metal plate is economically attached to cables of different size by means of the cast metal mass, the cable terminal assembly of the present invention is adapted for use with different types of automotive batteries.

Alternative versions of the conductive metal plate utilize integrally formed tangs for piercing or crimping to the cable conductors, and also an integrally formed conductive spacer ring for establishing multiple stacked connections.

It is therefore one object of the present invention to provide an improved more economical cable terminal assembly.

It is another object of the present invention to provide stackable, moisture-sealed battery terminal connections to prevent or impede corrosion at battery terminal posts.

It is another object of the present invention to provide an improved more economical method for manufacturing a cable terminal assembly.

It is still another object of the present invention to provide an improved economical system for enabling the connection of a plurality of battery terminals in common.

It is yet another object of the present invention to provide a more versatile battery cable terminal assembly capable of use with different types of batteries and multiple battery arrangements.

Other objects and features of the present invention will become apparent on examination of the following specification and claims together with the accompanying drawings.

BRIEF DESCRIPTION OF THE DRAWINGS

FIG. 1 is a generally schematic view illustrating cable terminal assemblies incorporating the principles of the present invention employed to interconnect a plurality of maintenance free batteries;

FIG. 2 is a top plan view of a cable terminal assembly incorporating the principles of the present invention;

FIG. 3 is a side elevational view of the cable terminal assembly of FIG. 2;

FIG. 4 is a sectional view taken generally along the line 4—4 in FIG. 1 to illustrate the connection of a single cable terminal assembly to a battery terminal;

FIG. 5 is a sectional view taken generally along the line 5—5 in FIG. 1 to illustrate the connection of two cable terminal assemblies in stacked relation on one battery terminal;

FIG. 6 is an exploded isometric view of a stack of cable terminal assemblies such as shown in FIG. 5;

FIG. 7 illustrates a cable terminal assembly incorporating the principles of the present invention connected on a terminal formed on the side of a maintenance free automotive battery;

FIGS. 8 and 9 are top and side views respectively of an alternative embodiment showing a conductive metal plate having a plurality of tangs formed thereon for increased contact with an associated cable conductor;

FIGS. 10 and 11 are side and end views respectively of another version of the plate employing a pair of end tangs for crimping engagement with an associated cable conductor; and FIGS. 12, 13 and 14 are side, end and top views respectively of a conductive terminal plate having an integrally formed conductive spacer ring thereon, together with end flanges for crimping onto an associated cable conductor.

DESCRIPTION OF THE PREFERRED EMBODIMENT

In FIG. 1 a portion of a vehicle battery system incorporating the principles of the present invention is indicated generally by the reference character 10. The system 10 illustrates a plurality of maintenance free batteries 12, 14 and 16 spaced apart by a predetermined distance in accordance with the position of associated battery supporting apparatus (not shown) on the equipment in which the batteries are mounted. Each battery includes a pair of terminal posts 18 with one terminal post serving as the positive terminal and the other as the negative terminal.

Each terminal post or stud 18 of battery 12, for example, is connected to a respective terminal 18 of battery 14 over a respective one of a pair of cable 20, and the terminals 18 of battery 14 are in turn connected over a respective one of a pair of cables 22 to respective terminals 18 of battery 16. One terminal of battery 16 is connected over a respective one of a pair of cables 24 to ground (not shown), and the other cable 24 is, for example, connected to an engine starter (not shown), usually through the contacts of a relay or solenoid (not shown) for operation by the engine ignition switch.

The number of batteries shown are merely exemplary, but a plurality are commonly required in many applications to ensure sufficient power for initiating engine operation. It will be noted that batteries 12 and 14, which may be furthest from the output, require only single lengths of cables 22 and 24 for connecting the respective terminals to the output, since each battery terminal on batteries 14 and 16 is connected in common to two cables by means of the improved stacking terminal assemblies as will now be explained.

As best seen in FIGS. 4, 5 and 6 each battery terminal 18 comprises an enlarged cylindrical boss or shoulder 28 projecting somewhat from the top of the insulating body 30 of the battery. A threaded stud 32 projects from the boss 28 for engagement with a closed end nut 34 for securing a cable terminal assembly 26 to a respective battery terminal 18 in a moisture sealed connection.

As best seen in FIG. 4 each cable 20, 22 and 24 comprises a plurality of wire strands 36 usually of copper and covered by an insulating jacket or cover. The ends of the copper wire strands or conductors 36 project beyond the ends of the cover 38 for connection to a respective cable terminal assembly 26.

Each cable terminal assembly 26 comprises a conductive metal terminal plate 40, of copper, for example, joined with one end of the copper wire strands 36 by a cast mass 42 of conductive material. The terminal plate 40 and conductive mass 42, together with a portion of the cable cover 38, are covered and electrically insulated by an outer terminal jacket 44. The conductive cast mass 42 may by way of example be formed of lead or a lead tin alloy, and it may be dimensioned substantially smaller than indicated.

The terminal plate 40 is provided with a round aperture 46 spaced from the outer end of the plate and from the conductive mass 42 for receiving the battery stud 32, and the jacket 44 is provided with an upper round opening 48 and a lower round opening 50 in a coaxial registry with aperture 46 and on opposite sides of terminal plate 40 for accommodating the stud 32 and the nut 34 to hold the terminal plate 40 engaged against the boss 28. The aperture 46 is located along the longitudinal axis of the plate and is spaced approximately midway between the outer end of the terminal plate and the conductive mass 42 with the outer end of the plate arcuately formed.

The conductive casting material 42 extends along the bottom, top and side edges of the terminal plate 40 beginning on the top surface at a position spaced from the outer end of the plate to accommodate the width of another terminal assembly, and at the bottom surface somewhat forwardly thereof. The conductive mass 42 thus overlaps and encapsulates the inner portion of the terminal plate 40, and surrounds the ends of the cable wires 36. It will be noted that the front surface of the conductive mass 42 above the terminal plate 40 slopes rearwardly at an angle of approximately 20° to facilitate application of a wrench.

The cast mass 42 of conductive material extends rearwardly of the terminal plate 40 over the exposed ends of the wire strands 36 encapsulating the wire and a major portion of the plate 40 providing a stable, rigid low resistance electrical connection therebetween, since the conductive casting material flows into the wire interstices and integrally bonds to both the wire and plate.

The insulating jacket or cover 44 encapsulates the conductive mass 42 and the terminal plate 40 and extends rearwardly of the mass 42 over a portion of the cable cover 38. The jacket 44 also extends forwardly of the conductive mass 42 along both the top, bottom and side edges of plate 40. A rounded front end is provided on the jacket 44 in conformity with the shape of the outer end of the plate 40 but of somewhat larger diameter. The jacket 44 forms a flat surface below the terminal plate 40 and conductive mass 42 and includes an upraised or projecting integral annular lip or ring 54 formed on the upper surface of jacket 44 around the axis of passages 48 and 50. The ring 54 is raised above the upper jacket surface so that its axial length corresponds to passage 50, and opening 48 is adapted to receive either the nut 34 or a spacer ring 56 in moisture-sealed relationship. The ring 54 has a diameter for receipt in the lower passageway 50 of another terminal assembly 26 to enable stacking within the axial length of a battery stud 32. An outwardly tapered guideway is also provided at the end of each passage 48 and 50 spaced from plate 40.

In order to form the terminal assemblies 26, each battery cable 20, 22 or 24 is cut to a predetermined length as typified by the distances between the battery terminals shown in FIG. 1. The cable cover 38 is stripped from the cable ends to expose the wire strands 36. The terminal plate 40 and the exposed wire ends are then inserted in a conventional die casting mold with the longitudinal plate axis aligned with the cable axis and the wire overlapping a portion of the terminal plate. The conductive casting material is then die cast onto the plate and exposed wire ends to form the mass 42 which integrally bonds the plate 40 and wire 36. The cable end together with the conductive mass 42 and terminal plate 40 are then inserted in a conventional plastic mold and the jacket 44 is molded thereabout in the configuration shown and described.

When only a single cable need be connected to a battery terminal 18, as indicated in FIGS. 2 and 3, the nut 34 associated with the battery terminal is simply removed from the stud 32, and the stud is received through passages 46, 48 and 50. The nut 34 is then threaded onto the stud 32 to engage the terminal plate 40 firmly against the boss 28. Any compression created against the jacket 44 between the plate 40 and the battery body 30 serves to provide back pressure for holding the nut against loosening. The projecting ring 54 on the jacket 44 receives the nut 34 in moisture-sealed relationship. The rearward slope of the conductive mass 42 permits facile application of a wrench for tightening the nut. It will be noted that the terminal plate 40 is relatively rigid for withstanding any normal forces applied thereto, and that no extraordinary stress is applied to conductive mass 42 during assembly of the terminal assembly.

At the second and third batteries 14 and 16 as shown in FIG. 1, two cable terminal assemblies 26 are connected in a stack 58 (see FIG. 5) to each battery terminal 18 to enable the connection of the cables directly to or between the batteries. The nut 34 on the respective battery terminal is removed and one cable terminal assembly 26 is engaged with the battery terminal by passing the stud 32 through the passages in the jacket 44 and terminal plate 40.

A conductive spacer ring 56 is then inserted over the stud 32 in the upper passage 48 of the jacket 44 as best seen in FIGS. 5 and 6, so that the spacer rests upon the upper surface of the terminal plate 40. The axial length of the spacer is substantially the same as the passage 48, so that the top surface of the spacer is substantially flush with the upper edge of the projecting ring 54. A second cable terminal assembly 26 is then positioned in stacked relationship on the stud 32 by engaging the ring 54 of the lower terminal assembly 26 in the passage 50 of the upper or second cable terminal assembly. The battery post 32 passes through the terminal plate 40 in the upper terminal assembly 26, and the nut 34 is then engaged in the passage 48 of the second or upper terminal assembly 26 and threaded on the stud 32. The bottom surface of the terminal plate 40 in the second or upper terminal assembly is therefore forced against the conductive spacer 56 to force the plate 40 of the lower assembly tightly against the boss 28 for providing a secure moisture-proof electrical connection.

While the drawings illustrate the cables in longitudinal alignment with the rounded front end of one terminal assembly facing in the opposite direction from the other terminal assembly of the stack 58, it will be appreciated that the projecting ring 54 of the lower terminal assembly received in passage 50 of the upper terminal assembly forms a pivot which permits a wide range of angular orientations of one terminal assembly relative to the other as indicated by the arrows 60 in FIG. 1. Since the distance between the axis of the pivot and the rearwardly sloping conductive mass 42 is greater than one-half the width of the terminal assemblies, one cable terminal assembly can be arranged at 180° to the other as indicated by broken lines 62 in FIG. 1, and can extend in any desired direction to greatly enhance the versatility with which connections can be extended.

The terminal assembly 26 may also be used with maintenance free automotive battery terminals as shown at 64 in FIG. 7. As shown in FIG. 7, the battery terminal comprises a nut 66 located on the side body portion 68 of the battery. The end of the nut 66 is engaged in passage 50 of assembly 26 for engagement with the terminal plate 40. A battery terminal stud 70 is threaded into nut 66 for tightening the terminal plate 40 against the nut 66 to complete the low resistance connection. It will be noted that the terminal assembly 26 may be oriented at any desired angle. It is also noted that the connection between terminal plate 40 and the cable 72 is easily provided by the conductive mass 42 irrespective of differences between the diameter of cable 72 and the previously mentioned cables 20, 22 and 24.

Referring now to FIGS. 8 and 9, there is shown an alternative form of terminal plate 80 having a battery post receiving passage 82 similar to terminal plate 40, but having tangs 84 and 86 formed thereon which project upwardly from plate 80. Tang 86 is formed along the longitudinal central axis of the terminal plate 80 adjacent the cable receiving end, and the tangs 84 are on opposite sides thereof and spaced longitudinally from tang 86 for piercing and/or crimping engagement with the cable conductors to further enhance electrical engagement and mechanical retention.

FIGS. 10 and 11 show a terminal plate 90 which is similar to plate 80 but, instead of a plurality of tangs formed intermediate the edges of the plate, plate 90 is provided with a pair of end wings or tangs 92 in addition to a tang 94 located along the central longitudinal axis of the plate. The wings or tangs 92 receive the cable conductors therebetween and are deformed into crimping engagement with the conductors 36 of the cable while the central tang 94 pierces the cable conductors to thus establish a secure electrical and mechanical connection.

In FIGS. 12-14, another version of the terminal plate is indicated by the reference character 100. The plate 100 incorporates a pair of end tangs 102 similar to the tangs 92 shown on plate 90 and providing the same function. If desired, additional tangs such as 84 and 86 may also be provided. The plate 100 is provided with an integrally formed conductive spacer ring, coaxially formed about the battery terminal receiving passageway 106. The spacer or apertured boss 106 is thus offset from the plane of the plate for engagement with either a flat plate of another terminal assembly or the boss surface of a plate having a similar configuration in another terminal assembly to provide a stacked or multiple moisture-sealed connection.

The foregoing constitutes a description of an improved battery cable terminal assembly and method of manufacture. The inventive concepts are not believed limited to the described embodiments, but are set forth in the accompanying claims.

What is claimed is:

1. A cable terminal assembly for use in establishing a connection between a conductor cable and a battery terminal of the type comprising a metal base and a threaded stud projecting upwardly from the base, the improvement comprising, in combination, a conductive metal terminal plate arranged so that one end thereof underlies an exposed end of said conductor, an aperture formed in the opposite end of said terminal plate to receive said stud member, connecting means connecting said conductor and terminal plate to form both a mechanical and electrical connection therebetween, an insulator jacket substantially covering said connecting means and said terminal plate, said insulator jacket having openings formed therein above and below said aperture in said plate, said openings being larger than said plate aperture to expose a portion of said plate surrounding said aperture, and a raised wall member formed integral with said jacket and surrounding the opening above said plate aperture, said opening below said plate aperture being dimensioned to receive said wall member to permit a plurality of said cable assemblies to be stacked one above the other in closely interfitted relation.

2. A cable terminal assembly as defined in claim 1 including an apertured conductive metal spacer receivable in said opening above said plate aperture in a lowermost one of a stacked pair of cable assemblies, said spacer being dimensioned to contact the terminal plates in a stacked pair of cable assemblies to establish electrical contact therebetween.

3. A cable terminal assembly as defined in claim 1 where said openings are round and said raised wall member is annular, whereby the angular relationship of one or more of a plurality of stacked cable assemblies may be varied.

4. A cable terminal assembly as defined in claim 3 where a nut is provided for threading on said stud member, said nut having a base portion dimensioned to be received within said raised wall member in close fitting relation thereto.

5. A cable terminal assembly for use in establishing a connection between a conductor cable and a battery terminal of the type comprising a metal base and a threaded stud projecting upwardly from the base, the improvement comprising, in combination, a conductive metal terminal plate arranged so that one end thereof underlies an exposed end of said conductor, an aperture formed in the opposite end of said terminal plate to receive said stud member, connecting means interconnecting said conductor and terminal plate to form both a mechanical and electrical connection therebetween, an insulator jacket substantially covering said connecting means and said terminal plate, said insulator jacket having round openings formed therein above and below said aperture in said plate, said openings being larger than said plate aperture to expose a portion of said plate surrounding said aperture, a raised annular wall member formed integral with said jacket and surrounding the opening above said plate aperture, said round opening below said plate aperture being dimensioned to receive said annular wall member to permit a plurality of said cable assemblies to be stacked one above the other in closely interfitted relation with each cable assembly being adjustable to a desired angular position, and a conductive metal spacer ring receivable in said opening above said plate aperture in a lowermost one of a stacked pair of cable assemblies, said spacer ring being dimensioned to contact the terminal plates in a stacked pair of cable assemblies to establish electrical contact therebetween.

6. A cable terminal assembly as defined in claim 5 where a nut is provided for threading on said stud member, said nut having a base portion dimensioned to be received within said raised annular wall member in close fitting relation thereto.

7. A cable terminal assembly for use in establishing a connection between a conductor cable and a battery terminal of the type comprising a metal base and a threaded stud projecting upwardly from the base, the improvement comprising, in combination, a conductive metal terminal plate arranged so that one end thereof underlies an exposed end of said conductor in direct contact therewith, an aperture formed in the opposite end of said terminal plate to receive said stud member, a cast mass of conductive metal in overlapping bonded relationship to the exposed end of said conductor and the adjacent end of said terminal plate to join said conductor and terminal plate together and establish an electrical connection therebetween without any crimping around said conductor, and an insulator jacket substantially covering said cast mass and said terminal plate, said insulator jacket having openings formed therein above and below said aperture in said plate, and said openings being larger than said aperture to expose a portion of said plate surrounding said aperture.

8. A cable terminal assembly as defined in claim 7 where said terminal plate is copper and said cast mass is made of a material taken from the group consisting of lead and lead-tin alloy.

9. A cable terminal assembly as defined in claim 7 where said one end of said terminal plate has at least one projecting member struck from said plate which extends upwardly into contact with said cable.

10. A cable terminal assembly for use in establishing a connection between a conductor cable and a battery terminal of the type comprising a metal base and a threaded stud projecting upwardly from the base, the improvement comprising, in combination, a conductive metal terminal plate arranged so that one end thereof underlies an exposed end of said conductor in direct contact therewith, an aperture formed in the opposite end of said terminal plate to receive said stud member, a cast mass of conductive metal in overlapping bonded relationship to the exposed end of said conductor and the adjacent end of said terminal plate to join said conductor and said terminal plate together and establish an electrical connection therebetween, an insulator jacket substantially covering said cast mass and said terminal plate, said insulator jacket having openings formed therein above and below said aperture in said plate, said openings being larger than said plate aperture to expose a portion of said plate surrounding said aperture, a raised wall member formed integral with said jacket and surrounding the opening above said plate aperture, said opening below said plate aperture being dimensioned to receive said wall member to permit a plurality of said cable assemblies to be stacked one above the other in closely interfitted relation, and a conductive metal spacer positioned in said opening above said plate aperture in a lowermost one of a stacked pair of cable assemblies, said spacer being dimensioned to contact the terminal plates in a stacked pair of cable assemblies to establish electrical contact therebetween.

11. A cable terminal assembly as defined in claim 10 including a nut for threading on said stud member, said nut having a base portion dimensioned to be received within said raised wall member in close fitting relation thereto.

12. A cable terminal assembly as defined in claim 10 where said raised wall member is annular and the opening in said jacket below said plate aperture is round, whereby said wall member and opening comprise a pivot which permits adjustment of the angular position of one or more of a plurality of stacked cable terminal assemblies.

13. A cable terminal assembly as defined in claim 12 where said conductive spacer is formed as a round spacer ring.

* * * * *